US006988581B2

(12) United States Patent
Croughs et al.

(10) Patent No.: US 6,988,581 B2
(45) Date of Patent: Jan. 24, 2006

(54) FUEL EFFICIENT POWER STEERING CONTROL SYSTEM AND METHOD

(75) Inventors: Dirk Croughs, Hoeselt (BE); Andreas Holthoff, Monheim-am-Rhein (DE); Peter Kocybik, Cologne (DE); Dale Killins, Detroit, MI (US); Steve Hung, Grosse Pointe Park, MI (US)

(73) Assignee: VisteonGlobal Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/712,184

(22) Filed: Nov. 13, 2003

(65) Prior Publication Data

US 2004/0226769 A1    Nov. 18, 2004

Related U.S. Application Data

(60) Provisional application No. 60/426,405, filed on Nov. 14, 2002.

(51) Int. Cl.
B62D 5/07 (2006.01)

(52) U.S. Cl. ....................... 180/442; 180/441

(58) Field of Classification Search ............... 180/422, 180/441, 417, 421; 137/116.3
See application file for complete search history.

(56) References Cited

U.S. PATENT DOCUMENTS

| 3,744,515 A | * | 7/1973 | Inoue ......................... 137/494 |
| 4,473,128 A | | 9/1984 | Nakayama et al. |
| 4,629,025 A | | 12/1986 | Brasier et al. |
| 4,775,022 A | | 10/1988 | Hirakushi et al. |
| 4,905,783 A | | 3/1990 | Bober |
| 5,029,660 A | | 7/1991 | Raad et al. |
| 5,111,660 A | | 5/1992 | Gettel |
| 5,123,497 A | | 6/1992 | Yopp et al. |
| 5,147,183 A | | 9/1992 | Gettel |
| 5,261,637 A | | 11/1993 | Curnow |
| 5,267,627 A | | 12/1993 | Frank et al. |
| 5,276,620 A | * | 1/1994 | Bottesch ....................... 701/41 |
| 5,289,894 A | | 3/1994 | Yoshiyuki |
| 5,487,007 A | | 1/1996 | Suzuki et al. |
| 5,508,919 A | | 4/1996 | Suzuki et al. |
| 5,513,720 A | | 5/1996 | Yamamoto et al. |
| 5,749,431 A | | 5/1998 | Peterson |

(Continued)

FOREIGN PATENT DOCUMENTS

EP        1024072 A1     8/2000

*Primary Examiner*—Tony Winner
(74) *Attorney, Agent, or Firm*—Brinks Hofer Gilson & Lione

(57) ABSTRACT

A system and method of controlling flow outlet from a hydraulic pump. The system provides the level of flow required to execute the driver's steering commands. This method of control reduces the average torque requirement of the hydraulic pump thereby improving fuel economy by unloading the vehicle's accessory drive, while also providing the variable assist power steering feature. The Fuel Efficient Power Steering (FEPS) control algorithm is an optimal method of regulating flow by actuating the electronic flow control device in the pump assembly. This electronic flow control device allows an increase in hydraulic fluid flow to the steering gear in order to increase the provided assist and to reduce hydraulic fluid flow to the steering gear to improve fuel economy, if no additional assist is needed. The calculation of the desired flow control device current is primarily based on vehicle speed and steering wheel rate. Some additional input signals such as steering angle or engine rpm could also be used for enhanced functionality.

39 Claims, 3 Drawing Sheets

U.S. PATENT DOCUMENTS

| | | |
|---|---|---|
| 5,758,741 A | 6/1998 | Tomioka |
| 5,948,029 A | 9/1999 | Straetker |
| 6,041,883 A * | 3/2000 | Yokota et al. .............. 180/422 |
| 6,069,460 A | 5/2000 | Grabowski et al. |
| 6,073,721 A | 6/2000 | Grabowski |
| 6,098,741 A | 8/2000 | Gluf, Jr. et al. |
| 6,101,435 A | 8/2000 | Baughn et al. |
| 6,173,223 B1 * | 1/2001 | Liubakka et al. ............. 701/42 |

* cited by examiner

FUEL EFFICIENT POWER STEERING CONTROL SYSTEM AND METHOD

CROSS REFERENCE TO RELATED APPLICATIONS

This application claims the benefit of related provisional application Ser. No. 06/426,405, filed Nov. 14, 2002, which is commonly assigned.

BACKGROUND

1. Field of the Invention

The present invention relates to a system and method for increasing the fuel economy of a steering system.

2. Description of Related Art

In conventional power assist steering systems using hydraulic fluid to provide steering assist, the pump provides a high outlet flow even if no steering assist is required. This will result in a high pump drive torque demand from the engine accessory drive. This drive torque demand directly affects vehicle fuel efficiency. Additionally, the high fluid flow results in poor road feedback and steering feel at high vehicle speeds leading to uncomfortable drive performance.

Prior art systems use an electronic flow control device to control the hydraulic fluid flow from the power steering pump to the steering gear. Such a system is described in U.S. Pat. No. 4,473,128. However, the fluid flow is not controlled for fuel efficiency. Furthermore, analog circuitry is used for the generation of control signals for the electronic flow control device.

An alternative implementation with an electronic flow control device is described in U.S. Pat. No. 4,629,025. Fluid flow is controlled in response to variations in steering wheel rate. However, fluid flow is not controlled to optimize fuel efficiency.

Implementations of the required hardware components for a system with an electronic flow control device are described in U.S. Pat. Nos. 5,147,183, 5,261,637 and 5,111,660.

U.S. Pat. No. 5,029,660 describes an implementation of a steering system using an electronic flow control device, which is designed to provide variable fluid flow for different driving situations. However, the algorithm is not designed to provide fuel efficiency.

An implementation for a steering system with variable fluid flow is described in U.S. Pat. Nos. 6,069,460 and 6,101,435. Here an electro-hydraulic system is described. The electro-hydraulic system uses an electric motor to drive the power steering pump as opposed to the power steering pump being driven by the engine accessory drive. The algorithm described is for the speed control of the electric motor as opposed to control of an electronic flow control device, such as a valve.

In U.S. Pat. No. 6,098,741 and EP 1 024 072 A1 a system with an electronic flow control device is described. However here a steering torque sensor is required to provide variable fluid flow.

In view of the above it is apparent that there is a need for an improved system and method to control a vehicle steering system.

SUMMARY

In satisfying the above need, as well as overcoming the enumerated drawbacks and other limitations of the related art, the present invention provides a system and method for controlling a vehicle steering system. An embodiment of the system includes an electronic control unit having an algorithm for calculating and controlling a current provided for the control of an electronic flow control device. The electronic flow control device controls the fluid flow from a power steering pump assembly to the steering gear in a hydraulic steering system in order to provide variable steering assist to the driver with particular attention for fuel economy.

To control the system, input information from the vehicle controller is evaluated, in particular vehicle speed and steering wheel rate. Based on the evaluated information a desired current for the electronic flow control device is calculated. The calculated desired current value is compared to measured actual flow control device current. The deviation is minimized utilizing a proportional-integral-derivative (PID) control to generate a command value for the electronic flow control device current.

Further objects, features and advantages of this invention will become readily apparent to persons skilled in the art after a review of the following description, with reference to the drawings and claims that are appended to and form a part of this specification.

DETAILED DESCRIPTION

Figure 1:
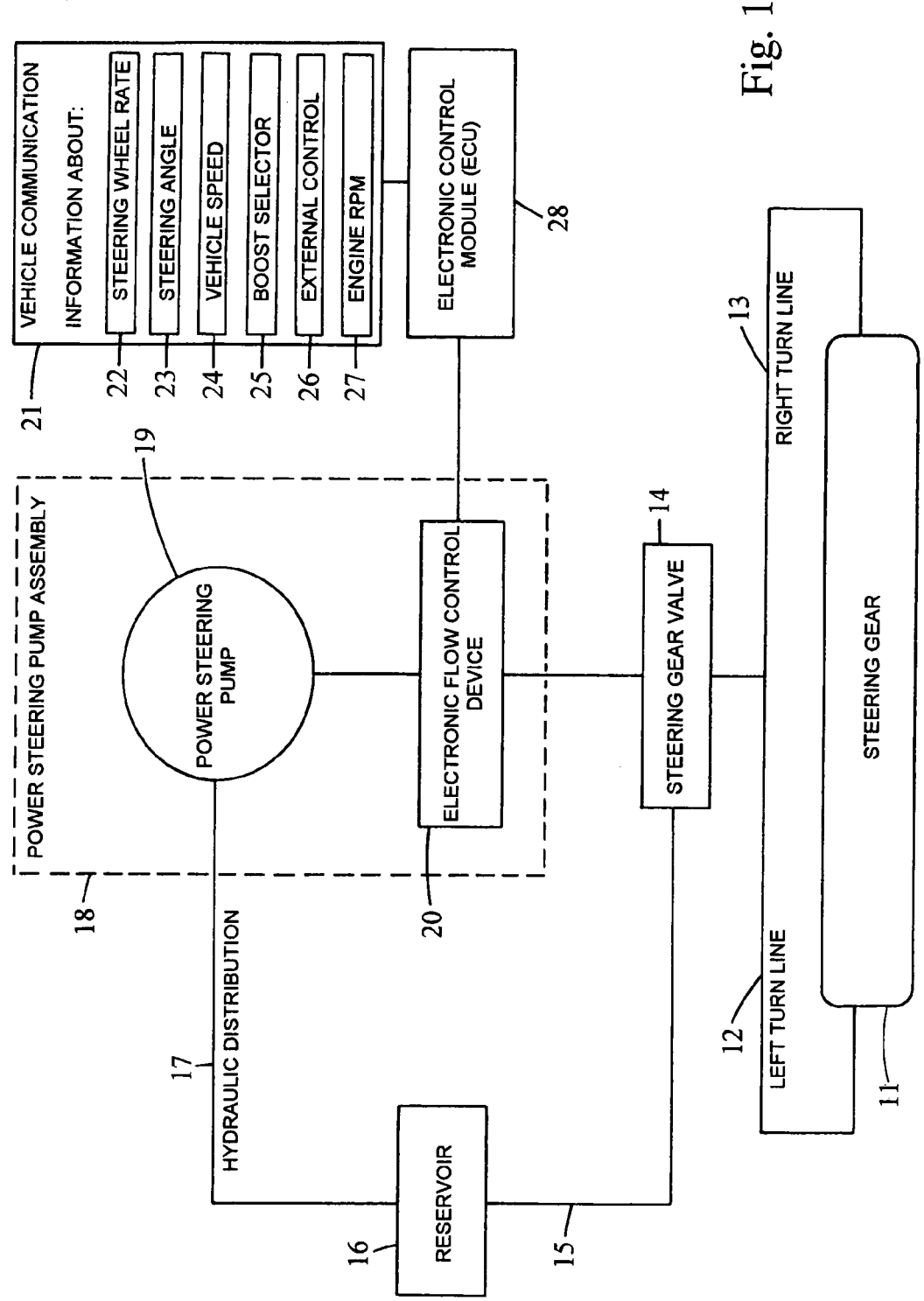
FIG. 1 shows a schematic block diagram of the system in accordance with the present invention.

Referring now to FIG. 1, a system embodying the principles of the present invention is illustrated therein and designated at 10. The system 10 includes a steering gear 11, a steering gear valve 14, a reservoir 16, a power steering pump assembly 18, an electronic control unit (ECU) 28, and vehicle sensing information 21.

Steering gear 11 manipulates the orientation of the wheels (not shown) to steer the vehicle. Steering gear 11 is manipulated to turn left by hydraulic fluid entering the steering gear 11 by the left-turn line 12. Conversely, the steering gear 11 is manipulated to turn right by the fluid entering the steering gear 11 through the right-turn line 13. The steering gear valve 14 connects the left-turn line 12 and right-turn line 13 to the power steering pump assembly 18 or the reservoir 16 through the hoses 15. To manipulate the steering gear 11 to turn right, the steering gear valve 14 connects the right-turn line 13 to the power steering pump assembly 18, while the left turn line 12 is connected to the reservoir 16. The power steering pump assembly 18 includes the power steering pump 19 and a electronic flow control device 20. The power steering pump 19 is connected to the vehicle engine (not shown) and provides hydraulic fuel pressure to the steering system. The power steering pump 19 is connected to the reservoir 16 through the hydraulic distribution 17. Further, the power steering pump 19 is connected to the electronic flow control device 20 to provide hydraulic pressure for manipulating the steering gear 11.

The electronic flow control device 20 is connected to the electronic control unit 28. The electronic control unit 28 collects information from the vehicle communication system 21 including the steering wheel rate 22, the steering angle 23, vehicle speed 24, driver operational selection 25, steering assist override 26, and engine speed 27. The electronic control module 28 uses the information from the vehicle communication system 21 to provide a current to the electronic flow control device 20 providing control of the fluid flow and manipulation of the steering gear 11.

Figure 2:
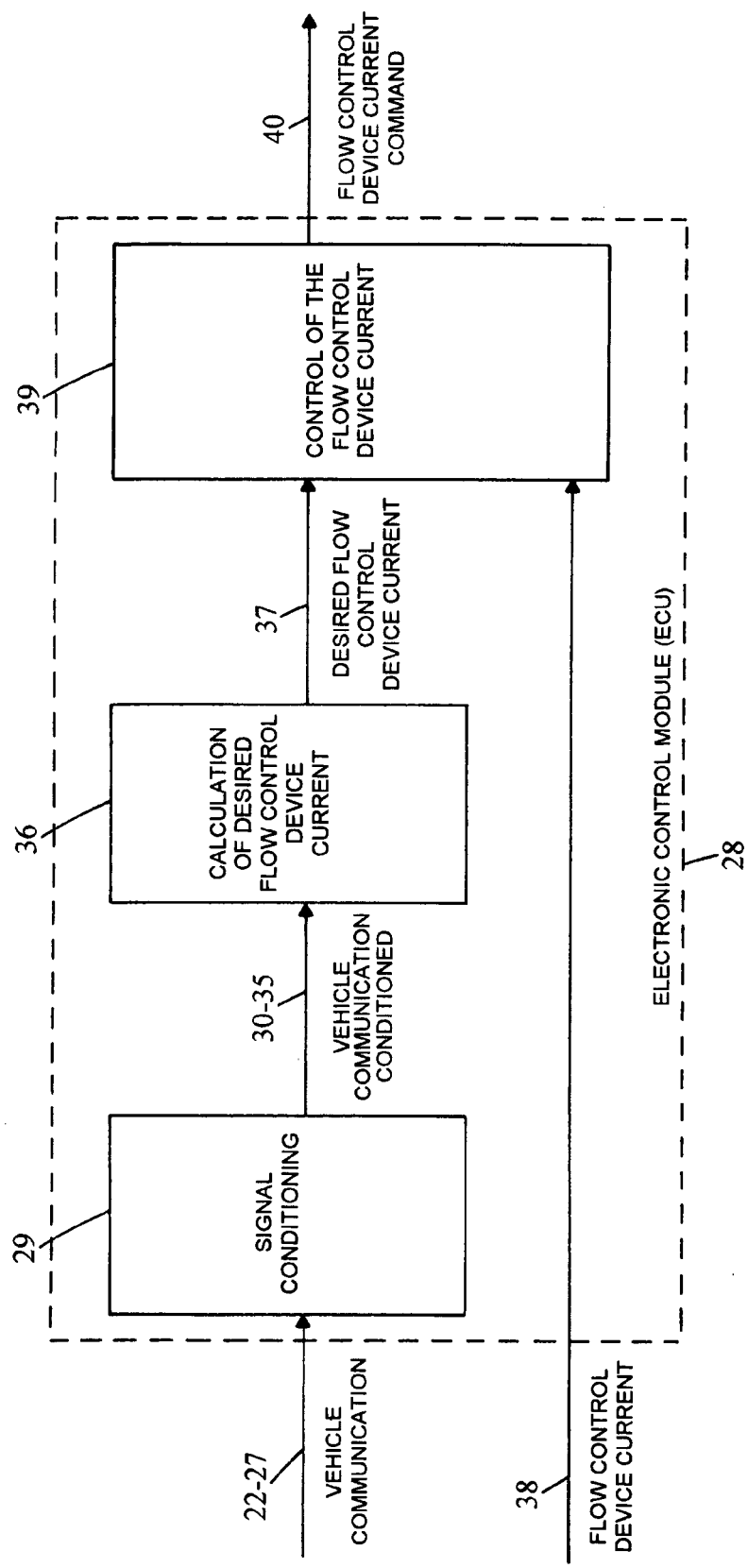
FIG. 2 shows a block diagram of the functional structure of the control algorithm in accordance with the present invention.

Now referring to FIG. 2, the functional structure of the control algorithm is provided. The control algorithm resides within the ECU 18, and includes three modular blocks, the signal conditioning block 29, the calculation of desired flow control device current block 36, and the control of electronic flow control device current block 39 which can be adapted to different vehicle applications. The signal conditioning block 29 provides conditioning, filtering and averaging of input signal information 22–27 from the vehicle communication system 21.

Figure 3:
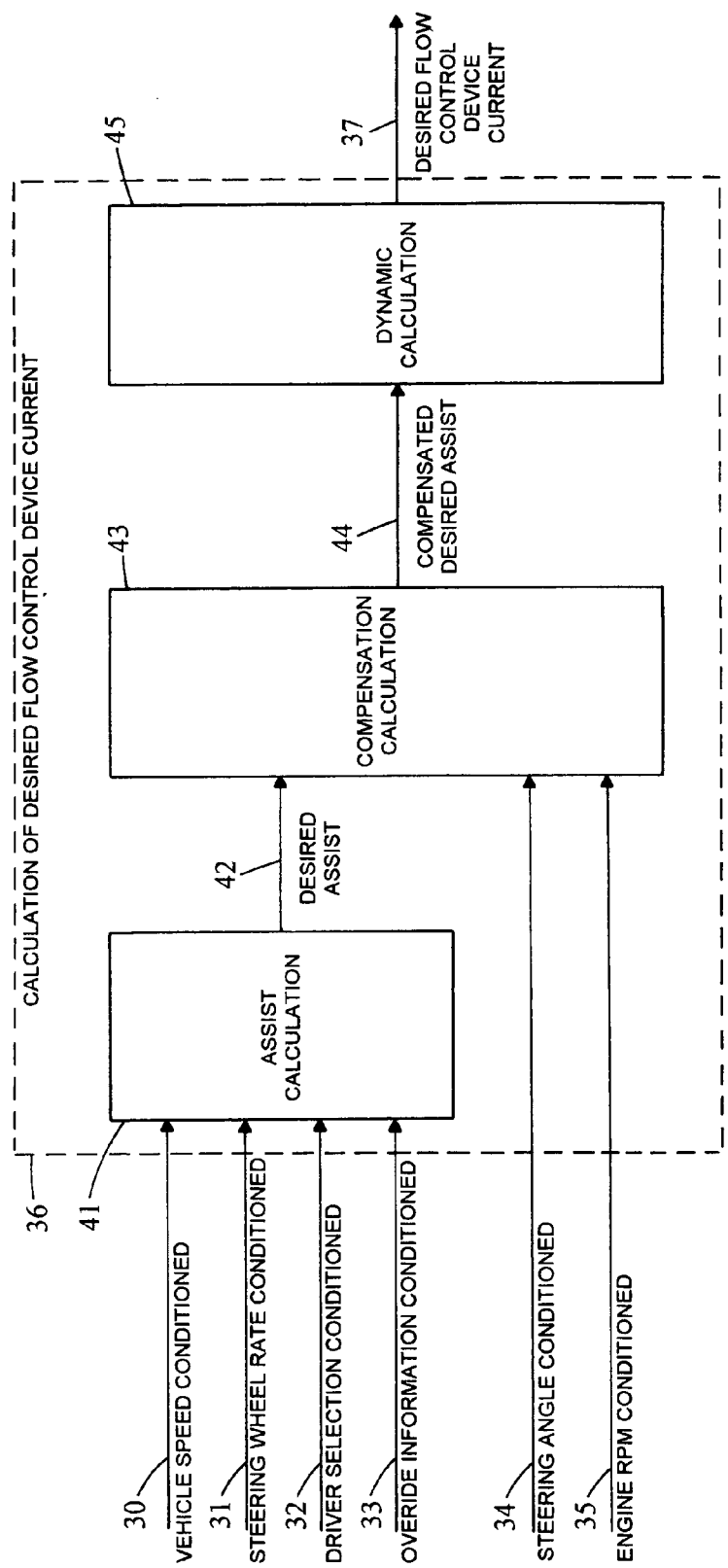
FIG. 3 is a block diagram of the steering control logic of the system in accordance with the present invention.

The calculation of desired flow control device current block 36 evaluates the conditioned information from block 29, signals 30–35, in particular the conditioned information about vehicle speed 30 and steering wheel rate 31, provided in more detail in FIG. 3, and calculates a value for the desired electronic flow control device current 37.

Referring to FIG. 3, the functional structure of block 36 is provided in more detail. Block 36 contains three functional sub blocks. The first sub block is the calculation of the desired assist 41. Block 41 evaluates signals 30, 31, 32 and 33 and generates the desired assist 42. The desired assist 42 is passed to the compensation calculation block 43. Block 43 evaluates signal 34 and 35 and compensates the desired assist signal 42, depending on the recognized steering situation to generate the compensated desired assist 44. The dynamic calculation block 45 performs dynamic calculations on the compensated desired assist signal 44 to generate the desired flow control device current 37.

For straight-ahead conditions with no or minimal steering inputs the monitored steering wheel rate will be zero or very small. This condition will be recognized by block 36 and the desired electronic flow control device current 37 will be adjusted to result in reduced fluid flow. The reduction in fluid flow minimizes the parasitic hydraulic losses in the steering system causing a reduction of power steering pump drive torque demand, thereby unloading the accessory drive. The reduction in drive torque is directly related to the vehicle's fuel consumption. If higher steering wheel rates are present, the algorithm will quickly recognize this dynamic steering situation and immediately adjust the fluid flow to higher levels in order to provide sufficient assist for dynamic maneuvering.

To identify high speed driving situations, block 36 evaluates the conditioned vehicle speed information 30. For high speed driving situations the fluid flow is reduced in order to reflect the lower hydraulic force required at higher vehicle speeds. Further, the reduced hydraulic force provides the driver with improved road feedback contributing to a reduction of accessory drive torque, thereby improving fuel efficiency.

The control of electronic flow control device current block 39 evaluates the desired electronic flow control device current 37 and the actual electronic flow control device current 38 and performs a PID control to minimize the deviation between the desired and actual electronic flow control device current and generates a value for the electronic flow control device current command 40.

In an aspect of the present invention, block 36 uses a two dimensional lookup table for the calculation of the desired flow control device current 37. This lookup table contains tunable interpolation points for vehicle speed and steering wheel rate which correlate to tunable assist level values. Using a lookup table allows a calculation of the desired flow control device current, which is optimized for a wide range of vehicle drive situations. Known prior art systems calculate one control portion based on steering wheel rate information and a second control portion based on vehicle speed information. These two control portions will then be combined resulting in a final control command for the desired flow control device current. This calculation method neglects the interdependence of the two control portions and will result in a suboptimal steering assist. The two dimensional calculation of the desired flow control device current allows to compensate the effect of these interdependences.

In another aspect of the present invention, the control algorithm evaluates additional driver selection information 32 in block 36. Different steering assist profiles are calculated and utilized to generate the desired flow control current 37 for each driver based on the driver selection information 32. The different steering assist profiles provide each driver with a subjectively more optimal steering feel.

In another aspect of the present invention, the control algorithm evaluates additional override information from other vehicle control modules in block 36 allowing the generation of appropriate steering assist for emergency or failure situations. Other vehicle control modules may have additional information about the current operating condition of the vehicle which allows the control algorithm to make decisions about appropriate steering assist levels for these operating conditions.

In another aspect of the present invention, the control algorithm block 36 uses variable calculation loop times. For dynamic situations, such as high steering wheel rates, shorter loop times will be used in order to allow for higher control bandwidth. For quasi static situations longer loop times will be used to reduce electronic control unit calculation load.

In another aspect of the present invention, the control algorithm block 45 calculates and evaluates vehicle acceleration. For high vehicle accelerations, the steering assist will be adjusted to reflect the new vehicle speed driving situation more quickly. The dependency on vehicle acceleration can be realized using a tunable one dimensional lookup table, giving the correlation between vehicle acceleration and a compensation factor. The respective compensation factor can finally be calculated using a linear interpolation.

In another aspect of the present invention, the control algorithm block 43 uses additional information about the steering angle 34 to calculate a compensation contribution for vehicle cornering conditions. For vehicle cornering conditions the steering wheel rate will be zero or very low however residual steering forces are still high. It is therefore necessary to increase the fluid flow compared to the driving straight-ahead condition resulting in appropriate cornering steering assist.

In another aspect of the present invention, the control algorithm block 41 uses a tunable dead-band for small steering wheel rates. This dead-band will compensate steering assist disturbances. The dead band allows the control algorithm to reject noise on the steering wheel rate signal while retaining the dynamic control bandwidth, in contrast, state of the art systems use low-pass filters for disturbance rejection.

In another aspect of the present invention, the control algorithm block 43 evaluates information about steering angle 34 and decides if the lock stop position of the steering gear is reached to calculate a compensation factor. The compensation factor will result in a substantially reduced fluid flow at lock stop, thus resulting in improved efficiency and noise performance.

In another aspect of the present invention, the control algorithm block 43 evaluates information about engine speed, typically measured in revolutions per minute (rpm). The algorithm has prior knowledge about the flow characteristic of the power steering pump derived from measurements or simulations. The engine speed information is used to compensate for flow variations of the power steering pump over the engine speed range. The compensation can be realized using a one dimensional lookup table with tunable interpolation points for engine speed. This lookup table gives the required correlation between engine speed and the required compensation of the desired flow control device current. The compensation for flow variation will eliminate fluctuations in the steering assist with engine speed, which occurs most notable during gear shifts.

In another aspect of the present invention, the control algorithm block 43 compensates for flow control device hysterosis using prior knowledge about the flow versus current characteristic of the electronic flow control device. This information can be derived from measurements or simulations. Block 43 compensates for non linear relationships between flow and current of the electronic flow control device, thus ensuring that the desired flow will be generated in the electronic flow control device, which results in the desired steering assist regardless of non-linearities.

In another aspect of the present invention, the control algorithm block 36 uses normalized values for the physical range of each variable. Using normalized values ensures that different sensors can be used for different implementations of the same signal. This means that block 36 and 39 of the algorithm, the control part of the algorithm, can be utilized for multiple sensor implementations. Only modifications of block 29 are required to adapt to different sensors for different implementations, thus reducing the time required to modify the algorithm for different implementations.

In another aspect of the present invention, the control algorithm block 29 is implemented directly digitizing the incoming input signals, where the digitizing period is matched to the refresh time of the incoming signals. This will result in higher dynamic control bandwidth by eliminating the time lag introduced by hardware filtering of the input signals.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A system for controlling a vehicle steering system comprising:
   a power steering pump;
   an electronic flow control device coupled to the power steering pump; and
   an electronic control unit configured to control the electronic flow control device such that hydraulic parasitic losses are minimized wherein the electronic control unit is configured to monitor actual electronic flow control device current and generate a final control signal based on a desired electronic flow control device current and the actual electronic flow control device current.

2. The system according to claim 1, wherein the electronic flow control device is a valve.

3. The system according to claim 1, wherein the electronic control unit controls the electronic flow control device to reduce fluid flow based on a vehicle speed.

4. The system according to claim 1, wherein the electronic control unit controls the electronic flow control device to reduce fluid flow based on a steering wheel rate.

5. The system according to claim 1, wherein the electronic control unit is configured to calculate a desired steering assist for the electronic flow control device by interpolating values from a two dimensional lookup table.

6. The system according to claim 1, wherein the electronic control unit is configured to control the electronic flow control device based on a driver operational selection signal.

7. The system according to claim 1, wherein the electronic control unit is configured to control the electronic flow control device based on a steering assist override information.

8. The system according to claim 1, wherein the electronic control unit is configured to control the electronic flow control device using a variable loop time.

9. The system according to claim 8, wherein the variable loop time is shortened when the electronic control unit senses increasing steering wheel rates.

10. The system according to claim 1, wherein the electronic control unit is configured to control the electronic flow control device based on a vehicle acceleration.

11. The system according to claim 1, wherein the electronic control unit is configured to control the electronic flow control device based on a steering wheel rate and residual steering forces.

12. The system according to claim 1, wherein the electronic control unit is configured to control the electronic flow control device using a dead band for small steering wheel rates.

13. The system according to claim 1 wherein the electronic control unit is configured to control the electronic flow control device using information about a lock stop position of the vehicle steering system.

14. The system according to claim 1, wherein the electronic control unit is configured to control the electronic flow control device based on an engine speed.

15. The system according to claim 1, wherein the electronic control unit is configured to control the electronic flow control device compensating for hysteresis in the electronic flow control device.

16. The system according to claim 1, wherein a vehicle input signal information is directly digitized by the electronic control unit.

17. The system according to claim 16, wherein a digitizing period is matched to a refresh period of the vehicle input signal information.

18. The system according to claim 1, wherein the electronic control unit is configured to control the desired electronic flow control device using variable values normalized for the physical range of each variable.

19. A system for controlling a vehicle steering system comprising:
   a power steering pump;
   an electronic flow control device coupled to the power steering pump; and
   an electronic control unit configured to control the electronic flow control device such that hydraulic parasitic losses are minimized, wherein the electronic control unit is configured to control the electronic flow control device using a variable loop time; and the variable loop time is shortened when the electronic control unit senses increasing steering wheel rates.

20. A method for controlling a vehicle steering system comprising:
monitoring vehicle input signal information;
calculating a desired steering assist based on the vehicle input signal information;
controlling an electronic flow control device based on the desired steering assist; and
generating the desired steering assist demand such that hydraulic parasitic losses are minimized in the steering system wherein calculating the desired steering assist includes calculating a compensation factor for vehicle cornering situations.

21. The method according to claim 20, wherein the electronic control unit controls the electronic flow control device to reduce fluid flow based on a vehicle speed.

22. The method according to claim 20, wherein the electronic control unit controls the electronic flow control device to reduce fluid flow based on a steering wheel rate.

23. The method of claim 20, further comprising:
monitoring actual electronic flow control device current;
generating a final control signal as a function of a calculated desired electronic flow control device current and an actual electronic flow control device current.

24. The method of claim 20, wherein the calculation of the desired steering assist includes interpolating values from a two dimensional lookup table.

25. The method of claim 20, wherein the calculation of the desired steering assist is calculated evaluating a driver operational selection signal.

26. The method of claim 20, wherein the calculation of the desired steering assist is based on override information.

27. The method of claim 20, wherein calculating the desired steering assist includes using a variable loop time.

28. The method of claim 20, wherein calculating the desired steering assist is based on vehicle acceleration.

29. The method of claim 20, wherein calculating the desired steering assist is calculated using a dead-band for small steering wheel rates.

30. The method of claim 20, wherein calculating the desired steering assist is calculated using information about a lock stop position of the vehicle steering system.

31. The method of claim 20, wherein calculating the desired steering assist is based on information about engine speed.

32. The method of claim 20, wherein calculating the desired steering assist includes compensating for hysteresis in the electronic flow control device.

33. The method of claim 20, wherein the calculation of the desired steering assist is calculated using variable values normalized for the physical range of each variable.

34. The method of claim 20, wherein vehicle input signal information is directly digitized.

35. The method of claim 33, wherein a digitizing period is matched to a reference period of the vehicle input signal information.

36. A system for controlling a vehicle steering system comprising:
a power steering pump;
an electronic flow control device coupled to the power steering pump; and
an electronic control unit configured to control the electronic flow control device such that hydraulic parasitic losses are minimized, wherein the electronic control unit is configured to control the electronic flow control device based on a steering wheel rate and residual steering forces.

37. A system for controlling a vehicle steering system comprising:
a power steering pump;
an electronic flow control device coupled to the power steering pump; and
an electronic control unit configured to control the electronic flow control device such that hydraulic parasitic losses are minimized, wherein the electronic control unit is configured to calculate a desired steering assist for the electronic flow control device by interpolating values from a two dimensional lookup table.

38. A system for controlling a vehicle steering system comprising:
a power steering pump;
an electronic flow control device coupled to the power steering pump; and
an electronic control unit configured to control the electronic flow control device such that hydraulic parasitic losses are minimized, wherein the electronic control unit is configured to control the electronic flow control device using information about a lock stop position of the vehicle steering system.

39. A system for controlling a vehicle steering system comprising:
a power steering pump;
an electronic flow control device coupled to the power steering pump; and
an electronic control unit configured to control the electronic flow control device such that hydraulic parasitic losses are minimized, wherein the electronic control unit is configured to control the electronic flow control device compensating for hysteresis in the electronic flow control device.

* * * * *